(12) United States Patent
Díaz et al.

(10) Patent No.: US 8,097,307 B2
(45) Date of Patent: Jan. 17, 2012

(54) METHOD OF STRENGTHENING STONE AND OTHER CONSTRUCTION MATERIALS

(75) Inventors: María Jesús Mosquera Díaz, Puerto Real (ES); Antonio Montes Herrera, Puerto Real (ES); Desiree De Los Santos Martínez, Puerto Real (ES)

(73) Assignee: Universidad de Cádiz, Cádiz (ES)

( * ) Notice: Subject to any disclaimer, the term of this patent is extended or adjusted under 35 U.S.C. 154(b) by 668 days.

(21) Appl. No.: 11/997,356

(22) PCT Filed: Jul. 5, 2006

(86) PCT No.: PCT/ES2006/000385
§ 371 (c)(1),
(2), (4) Date: Jan. 30, 2008

(87) PCT Pub. No.: WO2007/017533
PCT Pub. Date: Feb. 15, 2007

(65) Prior Publication Data
US 2008/0209847 A1 Sep. 4, 2008

(30) Foreign Application Priority Data
Jul. 30, 2005 (ES) .................................. 200501887

(51) Int. Cl.
*B05D 3/02* (2006.01)
(52) U.S. Cl. ........................................ 427/387; 427/384
(58) Field of Classification Search .................. 427/387, 427/384
See application file for complete search history.

(56) References Cited

U.S. PATENT DOCUMENTS 4,478,911 A * 10/1984 Price .............................. 428/332
6,387,453 B1 * 5/2002 Brinker et al. ................. 427/387

OTHER PUBLICATIONS

Nagamine, Shinsuke, et al., Effects of catalytic acid and templating surfactant concentrations on mesostructure of submillimeter-thick mesoporous silica by solvent evaporation synthesis, 2001, pp. 57-64, 49, Microporous and Mesoporous Materials.
Prado, Alexandre G.S., et al., Different neutral surfactant template extraction routes for synthetic hexagonal mesoporous silicas, 2002, pp. 3823-3826, 12, The Royal Society of chemistry.
Mosquera, Maria J., et al, Producing Crack-Free Colloid-Polymer Hybrid Gels by Tailoring Porosity, 2003, pp. 951-957, 19, Langmuir.

* cited by examiner

*Primary Examiner* — Dah-Wei Yuan
*Assistant Examiner* — Robert S Walters, Jr.
(74) *Attorney, Agent, or Firm* — Tristan A. Fuierer; Moore & Van Allen, PLLC

(57) ABSTRACT

The invention relates to a method of strengthening stone and other construction materials. The inventive method is performed on the monument, building or statue in question or on any other object that has undergone deterioration. It achieves the formation of a mesoporous molecular sieve with an ordered topology in the pores of the altered substrate. The invention is advantageous in that:
  by considerably increasing the radius of the pores of the gel in relation to that of commercial binders, capillary pressure is significantly reduced and, with it, the risk of fractures in the material;
  by obtaining a binder having a uniform pore radius, the risk of fracture is prevented since it impedes the occurrence of stresses caused by pores of different sizes;
  by obtaining a mesoporous material with a given pore volume, the pores of the altered substrate are prevented from being blocked and, consequently, the damp-proofing of the building is impeded.

14 Claims, 4 Drawing Sheets

METHOD OF STRENGTHENING STONE AND OTHER CONSTRUCTION MATERIALS

CROSS-REFERENCE TO RELATED APPLICATIONS

This application is filed under the provisions of 35 U.S.C. §371 and claims the priority of International Patent Application No. PCT/ES2006/000385 filed on 5 Jul. 2006 entitled "Method of Strengthening Stone and Other Construction Materials" in the name of Mariá Jesús Mosquera Días et al., which in turn claims priority of Application No. P200501887 (Spain) filed on 30 Jul. 2005, all copies of which are hereby incorporated by reference herein in their entirety.

FIELD OF THE ART

The present invention relates to a method for strengthening stone and other porous construction materials, which are deteriorated as a result of their exposure to different atmospheric and/or polluting agents. Its main application is restoring monumental buildings and other pieces of historical-artistic value.

STATE OF THE ART PREVIOUS TO THE FILING DATE

In the last few decades there has been a spectacular increase in environmental pollution which has had an alarming effect on the deterioration of monumental buildings and historical sites. Pieces of great historical value, which have been acceptably preserved in a certain location for centuries, have experienced in the last few years a rapid and intense alteration process, to the point that from year to year it is possible to clearly detect the alteration of monuments constructed centuries and even millenniums ago. This situation has caused a high number of conservation interventions regarding our constructed heritage, as well as great interest in the industrial and scientific sectors for developing suitable conservation products.

Strengthening altered material is, without a doubt, one of the most frequent restoration interventions. The strengthening process consists of returning to a material the consistency it lost as a result of its alteration. Binder products act by filling the empty spaces of the material, which usually has a petrous nature, increasing its mechanical strength. The requirements which these products must have are well known:

Significantly increasing the mechanical strength of the material (an increase greater than 10%)
Maintaining the appearance and color of the substrate inalterable
Deeply and homogeneously penetrating the altered substrate, preventing the formation of superficial films
Preventing substantial modifications of the steam permeability of the material (a reduction less than 30%), allowing the evaporation of the water penetrating the building through other routes.
Having physiochemical, mechanical and dilation features similar to the substrate.
Preventing the formation of byproducts harmful to the material.
Having a certain degree of elasticity preventing the formation of the typical fractures of a rigid material Throughout history, materials varying in nature have been applied as binders, from inorganic products such as barium or calcium hydroxides, to natural organic substances such as waxes and vegetable oils. The variety of binders currently applied to restoration works is enormous and includes products as different as: acrylates, vinyl acetates, ethyl silicates, polysiloxanes, polyurethanes and epoxy resins, among others. In the book by Price (Stone Conservation. An Overview of Current Research. Edited by The J. Paul Getty. 1996) there is a wide review about these products.

Despite this great diversity of binders—some of them arose in the last few years such as tetrafluoroethylene emulsions (U.S. Pat. No. 4,764,431, Priority date: 16 Aug. 1988) or the $CaO/SiO_2/Al_2O_3$ ashes, (U.S. Pat. No. 5,059,251. Priority date: 22 Oct. 1991), alkoxysilanes and in particular tetraethoxysilane (TEOS), are the main components of most commercial products currently existing on the market. TEOS gels in the pores of the altered petrous material by means of a classic sol-gel transition. Specifically Tegovakon V (marketed by the multinational company Goldschmidt-Degussa) and Wacker OH (manufactured by Wacker Chemie Gmbh) are the indisputable leaders of the European market. As for the American market, Conservare H100 (manufactured by Prosoco) is perhaps the best known product. The advantages of these silicon monomers have been widely mentioned in the literature:

Reduced viscosity of the monomer allowing a quick and deep penetration in the petrous substrate.
The environmental moisture of the stone is sufficient to cause polymerization
It forms a stable gel in the pores of the stone with silicon-oxygen bonds similar to those existing in the minerals of the stone.

Nevertheless, these products have several drawbacks which have forced their application in certain petrous substrates to be questioned. For example, they have a limited cohesion to calcareous substrates, one of the main components of our monumental heritage. The bond between the stone and binder requires the presence of hydroxyl groups, which are virtually absent in the minerals typical of these stones (calcite, dolomite and aragonite). In order to achieve an efficient adhesion of the binder to the calcareous stone, Slavid and Weiss have come up with a method (U.S. Pat. No. 6,296,905, Priority date: 2 Oct. 2001), creating a hydroxyl layer on the petrous substrates as a step prior to its strengthening. The product has already been marketed by Prosoco with the name Conservare HCT.

Other drawbacks associated to TEOS binders are associated to the formation of a microporous dense polymeric silica network inside the altered stone. The reduced size of the pores of the gel causes a high capillary pressure in the network during the evaporation phase of the solvent, which causes fractures, causing on many occasions the complete rupture of the binder inside the pores of the stone. Several studies conducted on commercial products support this idea (Scherer, G. W.; Wheeler, G. E. *Proceedings of the 4th International Symposium on the Conservation of Monuments in the Mediterranean*; Moropulou, Zezza, Kollias and Papachristodoulou Eds.: Rhodes, Greece, 1997; Mosquera, M. J., Pozo, J., Esquivias, L., Rivas, T., Silva, B. J. Non-Cryst. Solids 2002, 311, 185-194.)

In the past few years several new products have been developed in which the fractures of the strengthened material are intended to be eliminated or reduced. For example Boos et al. were able to increase the plasticity of the product, reducing the risk of fracturing, upon adding organic derivatives to the silica network (Boos, M., Grobe, J., Hilbert, G. and Muller-Rochholz, J. Proceedings of the 8th Congress on Deterioration and Conservation of Stone, Berlin, 1996, pp. 1179-1185.) On the other hand, Scherer et al. added particles of titanium, silica or cobalt, chromium or iron oxides to the polymeric sol. The larger size of the colloidal particles produces gels in which the size of the pore is increased, the capillary pressure supporting the gel during the drying step being drastically reduced (Escalante, M. R., Flatt, R., Scherer, G. W., Tisiourva, D., Moropoulou, A. In Protection and Conservation of the Cultural Heritage of the Mediterranean Cities, Galan, Zezza, Eds. A. A. Balkema. The Netherlands, 2002.)

DESCRIPTION OF THE INVENTION

The present invention relates to a method for strengthening stone and other construction materials in an altered state. The strengthening process is developed in situ in the monument, building, statue or any other deteriorated object.

The method consists of the formation of a mesoporous molecular sieve—a material with interconnected pores of a uniform size—with an ordered topology in the pores of the altered substrate.

This new material achieves eliminating the drawbacks which commercial binders have (mentioned in the background of this specification), associated to the textural characteristics of the gel. In the following paragraph and for the purpose of facilitating the comprehension of the advantages of the present invention, the origin of these drawbacks is very briefly described.

The commercial products containing TEOS gel in the altered substrate forming a microporous polymeric network. The solvent evaporates through the pores of the polymer after the gelling. When a concave meniscus is formed in the liquid-vapor interface, a capillary pressure is created which according to the Young-Laplace equation is inversely proportional to the pore radius. Therefore, commercial binders, as a result of the reduced size of their pores, support a high capillary pressure causing the rupture of the gel inside the stone. This fragmented gel obviously does not suitably strengthen the mentioned substrate.

The material object of the present invention solves this drawback—essential for obtaining a binder product—in the following way:
  By considerably increasing the radius of the pores of the gel, the capillary pressure is significantly reduced, and with it, the risk of fractures in the material.
  Obtaining a binder having a uniform pore radius prevents the risk of fracture, since in this case the capillary pressure is equal in all its pores, preventing the occurrence of stresses which are actually what cause the rupture of the material.
  As an additional advantage, obtaining a mesoporous material with a pore volume significantly greater than that of commercial products, prevents the blocking of the pores of the altered substrate, and therefore prevent the damp-proofing of the building.

The material object of the present invention forms part of the family of the popular M41S molecular sieves, synthesized for the first time in 1992 by Mobil corporation investigators. These products are generically obtained by combining a silica monomer and a cationic surfactant, which is added at a concentration greater than the micelle concentration, forming a liquid crystal type structure. After the polymerization of the monomer, which occurs by means of a classic sol-gel process, the surfactant micellae are eliminated by means of a calcination process. The surfactant acts as a template, since the pores of the material correspond exactly to the gaps left by the micellae after being eliminated by the calcination process.

The novelty of the method object of this invention compared to other already known sieve syntheses, is based on the development of a method which allows the formation of the molecular sieve inside the altered substrate, the surfactant being eliminated at room temperature, without needing to subject the product to a calcination process. As is obvious, the modifications developed in the synthesis process are key modifications for their application as binder.

EMBODIMENT OF THE INVENTION

Figure 1:
FIG. 1 shows an image of the Tegovakon V binders (left) and the molecular sieve object of the present invention (right) after the drying phase. The commercial product is completely fractured, while the binder synthesized in our laboratory is a fracture-free transparent monolithic gel.

The method object of the present invention includes the following steps: First, an alkoxysilane, a surfactant, which can be removed by evaporation at room temperature, water, ethanol and hydrochloric acid are mixed. The alkoxysilane can be TEOS and the surfactant can be a primary amine such as n-octylamine. The concentration of the surfactant must be less than its critical micelle concentration so that said concentration is reached inside the substrate to be strengthened. The formation of micellae before the application to the stone would cause a significant increase in the viscosity of the starting sol which could reduce its penetration in the altered substrate. In order to achieve a good mixture of the products, it is advisable that such mixture occurs at reflux at a temperature ranging between 40-60° C. The concentration of hydrochloric acid must be sufficient to reach a pH of the mixture between 1-2. The alkoxysilane/water molar ratio must be equal to or greater than its stoichiometric ratio, 1:4 in the case of TEOS. The alkoxysilane/ethanol molar ratio must be equal to or greater than the ratio necessary to form a silica gel, 1:3.8 in the case of TEOS.

The next stage of the process is the impregnation of the material to be strengthened with the prepared sol. The binder can penetrate the substrate by impregnation of the surface by means of a brush or flat brush. In the case of small objects, they are impregnated by immersion in a tank containing the sol, or by capillary rise by means of surface contact of the binder and the lower face of the object. After the impregnation, the ethanol from the mixture begins to evaporate through the pores of the treated material; upon reaching the micelle concentration of the surfactant in the sol, a liquid crystal type structure is formed, brought about by the formation of the micellae.

The first step of the polymerization process is the hydrolysis of TEOS:

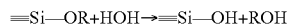

In a maximum time of 24 hours, polymerization occurs by simple condensation of the hydrolyzed alkoxysilane: ≡Si—OH+OH—Si≡→≡Si—O—Si forming the silica gel. The condensation reactions of the hydrolyzed alkoxysilane further occur with OH groups present on the surface of the mineral grains of the stone, achieving binder-stone adherence. The final step of the process is drying of the gel, by evaporation of the solvent and the surfactant through its pores. This process can take up to 7 days. The gel formed in the pores of the altered substrate is a mesoporous material with uniform pore size. A specific synthesis example is described below in which real data obtained in our research laboratory is included for the purpose of illustrating with more detail the method object of the patent and its advantages compared to commercial products.

Example 1

N-octylamine and TEOS were mixed together. The concentration of octylamine in the solution was (0.16% w/w). The rest of the precursors were then added: water, ethanol and hydrochloric acid under reflux at 60° C. for 90 minutes. The molar ratios of the mixture were: 1 TEOS/22 Ethanol/5 water/ 0.004 HCl/0.00498 n-octylamine. Finally the mixture was stirred for 10 minutes. Its viscosity was measured using a Brookfield rotational viscometer (DV-II+ model with UL/Y adaptor) for the purpose of verifying if the viscosity of the sol was suitable for its application as binder. The temperature of the experiment was 25° C. The viscosity of two of the most widely used commercial products as also measured: Tegovakon V (Goldschmidt-Degussa) and Wacker OH (Wacker Chemie Gmbh). The results corresponding to the three evaluated sols are shown in Table 1. The viscosity of the sol synthesized in our laboratory has an intermediate value between the values corresponding to the two evaluated commercial sols.

The three synthesized sols were then exposed to the laboratory conditions (20° C. and 60% humidity). The evaporation rate was limited by orifices for the purpose of simulating the process occurring in the pores of the strengthened stone. Polymerization occurred at the times indicated in Table 1. The gels maintained constant weight in a maximum time of 1 week, a fact indicative of the complete elimination of the solvents. In the case of the molecular sieve, a differential thermal analysis was carried out which allowed verifying the complete elimination of the surfactant in this period. FIG. 1 shows the two gels obtained. In the case of the molecular sieve it relates to a monolithic material without fractures, while the commercial product appears completely fragmented.

Figure 2:
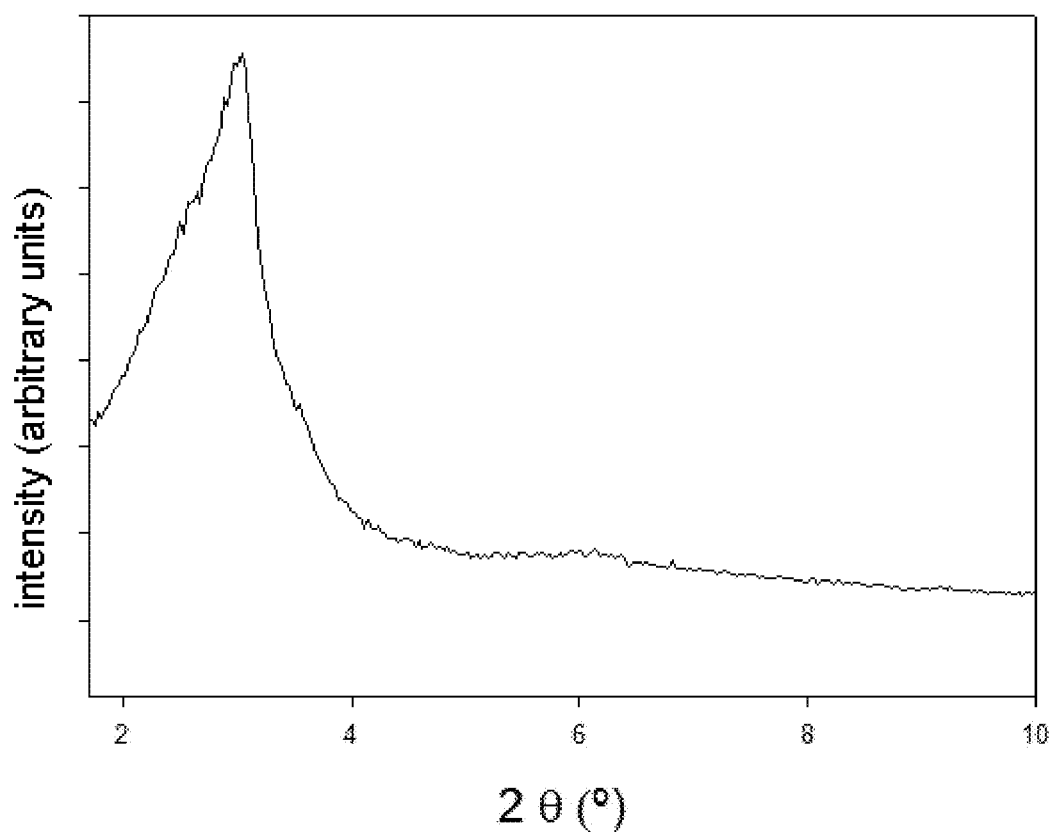
FIG. 2 shows an X-Ray diffractogram corresponding to the binder obtained according to the method described in example 1 of the present invention.
Figure 3:
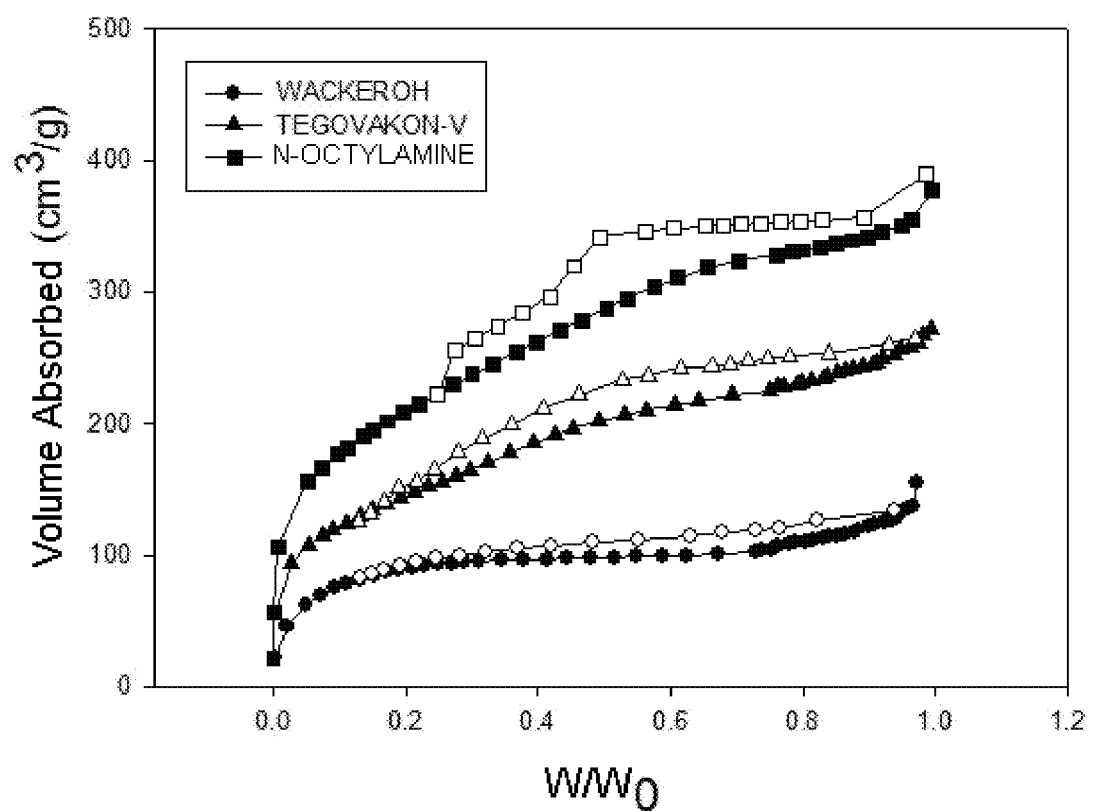
FIG. 3 shows nitrogen adsorption isotherms, corresponding to the binder obtained according to the method described in example 1 of the present invention and to the commercial products Wacker OH and Tegovakon V.
Figure 4:
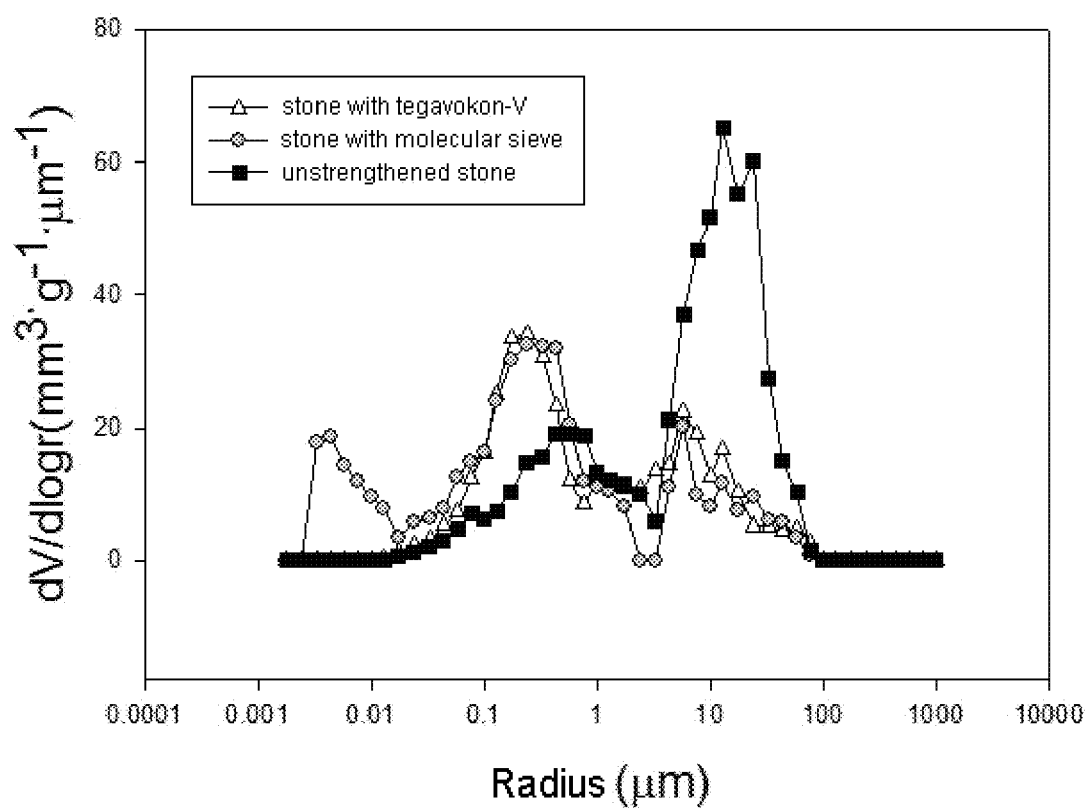
FIG. 4 shows pore radius distribution graphs corresponding to the untreated calcarenite stone and the strengthened stones according to the method described in example 2 of the present invention.

The tests which were carried out in order to verify the formation of a mesoporous molecular sieve were X-ray diffraction (by means of a Bruker D8 diffractometer model equipped with a copper tube) and nitrogen physisorption (by means of a Sorptomatic 1990 device from Fisions Instrument). The X-ray diffraction curve of the synthesized sample according to this example is shown in FIG. 2. The appearance of a well defined peak in interval 2-4 of diffraction angle $2\theta$ is an unequivocal sign of the formation of an ordered mesoporous structure. No defined peaks appear in the diffractogram corresponding to the commercial products, as is expected from an unordered material. FIG. 3 shows the physisorption isotherms of the material synthesized in the laboratory and of both commercial products. The isotherm of Wacker OH corresponds to a microporous material (type I of the IUPAC classification). In the case of Tegovakon V, although there is a certain hysteresis typical of the capillary condensation which occurs in mesoporous materials (type IV isotherm of the IUPAC), adsorption occurs at reduced pressures, which are typical of materials with pores in the microporous range. In the isotherm corresponding to the molecular sieve, a significant increase of adsorption pressure is observed in areas typical of mesoporous materials. The reduced hysteresis of this material suggests the existence of a narrow pore size interval. Table 1 includes data of the mean pore radius—calculated according to the HK model in commercial binders and the BJH model in the molecular sieve—and porous volume. The porous volume and pore radius values significantly increase in the molecular sieve in relation to those obtained for the commercial binders.

TABLE 1

| Binder | Viscosity 25° C. (mPa * s) | Polymerization Time (days) | Pore radius (nm) | Pore volume (cm³/g) |
|---|---|---|---|---|
| Example 1 | 2.54 | 1 day | 1.70 | 0.57 |
| Tegovakon V | 2.77 | 3 days | 0.58 | 0.40 |
| Wacker OH | 1.98 | 4 days | 0.54 | 0.29 |

Example 2

The method object of the present invention was used to strengthen a calcarenite stone used in constructing many of the emblematic monuments in the southwest Andalusia (the cathedrals of Seville and Cadiz, among others). This stone, which comes from a deposit located in the Port of Santa Maria (Cádiz) is fundamentally made up of calcite and quartz. Another series of test pieces of the same stone were impregnated with Tegovakon V 100.

For the purpose of evaluating the efficacy of the strengthening, the degree of penetration of both binders in the stone was determined by measuring the weight increase experienced by cubic test pieces of the stone (4 cm edge) after strengthening. For the purpose of characterizing the porous volume and size reduction of the pores blocked after the treatment, textural characterization of the stone before and after strengthening was carried out by means of mercury intrusion porosimetry (Pascal 140 and 440 models from Fisions Instrument). The test pieces used were 1 cm edge cubes. Changes in the vapor permeability of the stone were also evaluated before and after the treatments using an automated method developed in our laboratory (Mosquera, M. J., Benítez, D. and Perry, S. H. Cem. & Concr. Res. 2002, 32, 1883-1888), which represent an automation of the standard ASTM method E96-90 (Standard test methods for water vapor transmission of materials. Philadelphia, Pa., 1990: ASTM. p. 685-695). In this case, 4×4×1 cm samples were used. Finally, the effect the binders exert on the mechanical properties of the stone were evaluated by means of an uniaxial compression test in a device (Shimadzu Autograph AG-I Series model) able to carry out a maximum force of 5 KN, using test pieces with dimensions 2×1×1 cm.

As reflected in the weight increase values experienced by the stone after both treatments (Table 2 shows the mean values of 3 test pieces), the degree of penetration of both binders was very similar, being slightly greater in the case of the molecular sieve. As regards the textural evolution of the stone after the treatment, a slight reduction in the porosity after the strengthening is observed (The values of Table 2 correspond to the mean data of 3 test pieces), which is slightly greater for the commercial product. As for the distribution of the pores, both binders block the pores of the stone in a very similar manner. The fundamental difference between both is the appearance in the stone strengthened with the molecular sieve of pores with a radius between 1-10 nm which could correspond to the mesopores formed from the gel. The values of steam permeability in the unstrengthened stone and in the stone strengthened with the molecular sieve were similar (The data collected in Table 2 correspond to the mean values of four test pieces), whereas in the stone strengthened with the commercial product a reduction of said value was observed. The presence of mesopores in the molecular sieve favors the transport of steam through the stone. Finally, it must be indicated that the ultimate resistance to breakage of the stone in the compression test (the mean data of 10 test pieces is shown in Table 2) is slightly greater in the stone strengthened with the molecular sieve.

TABLE 2

| Sample | Weight (g/cm$^2$) | Porosity (%) | Permeability (m$^2$/s) | Strength (MPa) |
|---|---|---|---|---|
| Untreated stone | | 15.12 | $3.81 \cdot 10^{-7}$ | 31.13 |
| Stone with sieve | 0.20 | 12.88 | $4.15 \cdot 10^{-7}$ | 34.18 |
| Stone with TV V | 0.15 | 11.87 | $2.62 \cdot 10^{-7}$ | 30.48 |

Manner in which the Invention is Susceptible of Industrial Application

The method object of the present invention has an immediate industrial application in restoring and rehabilitating monumental buildings and any other pieces of historical-artistic value, and generally in restoring any porous construction material.

The invention claimed is:

1. A method for strengthening stones and other construction materials comprising the following steps:
    mixing an alkoxysilane, a surfactant, water, ethanol and hydrochloric acid to form a sol which acts as a binder, wherein the concentration of the surfactant is less than its critical micelle concentration and wherein said alkoxysilane, surfactant, water, ethanol and hydrochloric acid are at concentrations such that they allow reaching the critical micelle concentration of the surfactant inside the stone or other construction material to be strengthened before a gelling process occurs and wherein said surfactant can be eliminated by evaporation at room temperature;
    impregnating the stone or other construction material to be strengthened with the prepared sol to form a gel, wherein the critical micelle concentration of the surfactant is reached inside the stone or other construction material to be strengthened; and
    drying the gel by evaporation of the water, ethanol and surfactant.

2. The method according to claim 1, characterized in that the concentration of hydrochloric acid is sufficient to reach a pH of the mixture between 1-2.

3. The method according to claim 1, characterized in that the alkoxysilane/water molar ratio is equal to or greater than its stoichiometric ratio.

4. The method according to claim 1, characterized in that the alkoxysilane/ethanol molar ratio is equal to or greater than the ratio necessary to form a silica gel.

5. The method according to claim 1, characterized in that the impregnation of the binder can be carried out in the stone or other construction material by impregnating a surface by means of a brush or flat brush, by means of immersion in a tank containing the sol in the case of stone or other construction material of a reduced size, or by capillary rise by means of superficial contact of the binder and the lower face of the stone or other construction material.

6. The method according to claim 1, wherein the alkoxysilane comprises tetraethoxysilane (TEOS).

7. The method according to claim 1, wherein said surfactant comprises a primary amine.

8. The method according to claim 7, wherein said surfactant comprises n-octylamine.

9. The method according to claim 1, wherein said alkoxysilane comprises tetraethoxysilane (TEOS) and said surfactant comprises a primary amine.

10. The method according to claim 1, wherein said alkoxysilane comprises tetraethoxysilane (TEOS) and said surfactant comprises n-octylamine.

11. The method according to claim 6, wherein the tetraethoxysilane (TEOS)/water molar ratio is 1:4.

12. The method according to claim 6, wherein the tetraethoxysilane (TEOS)/ethanol molar ratio is 1:3.8.

13. A method for strengthening stones and other construction materials comprising the following steps:
    mixing an alkoxysilane, a surfactant, water, ethanol and hydrochloric acid to form a sol which acts as a binder, wherein said surfactant is present in a concentration is less than its critical micelle concentration;
    impregnating the stone or other construction material to be strengthened with the prepared sol to form a gel, wherein the critical micelle concentration of the surfactant is reached inside the stone or other construction material to be strengthened; and
    drying the gel by evaporation of the water, ethanol and surfactant.

14. The method of claim 13, wherein the gel is dried at room temperature.

\* \* \* \* \*